March 21, 1961
C. F. SASSERSON
2,976,513
LIGHT UNIT FOR VEHICLES
Original Filed Jan. 14, 1957
2 Sheets-Sheet 1
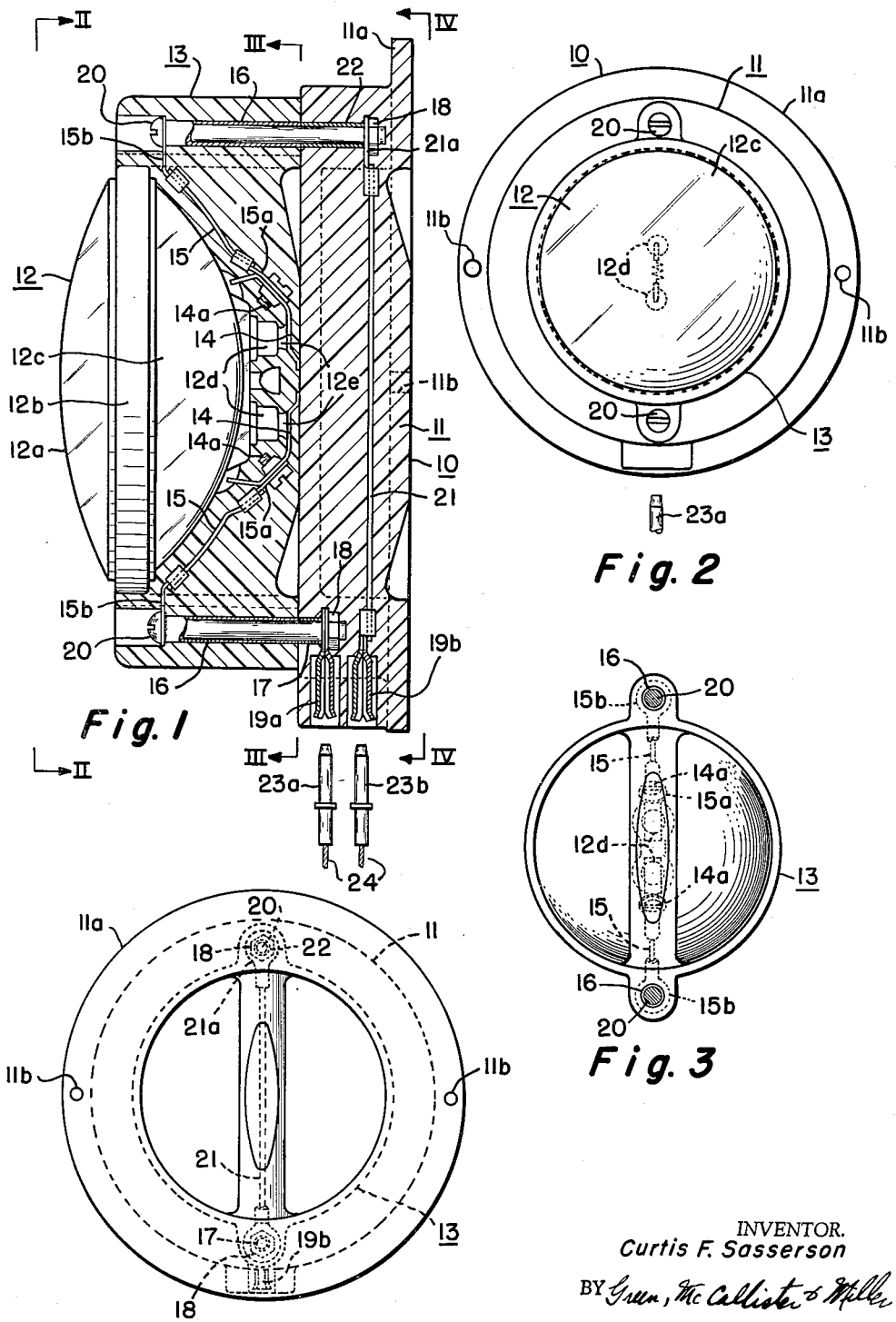
INVENTOR.
Curtis F. Sasserson
BY Green, McCallister & Miller
HIS ATTORNEYS March 21, 1961  C. F. SASSERSON  2,976,513
LIGHT UNIT FOR VEHICLES
Original Filed Jan. 14, 1957  2 Sheets-Sheet 2
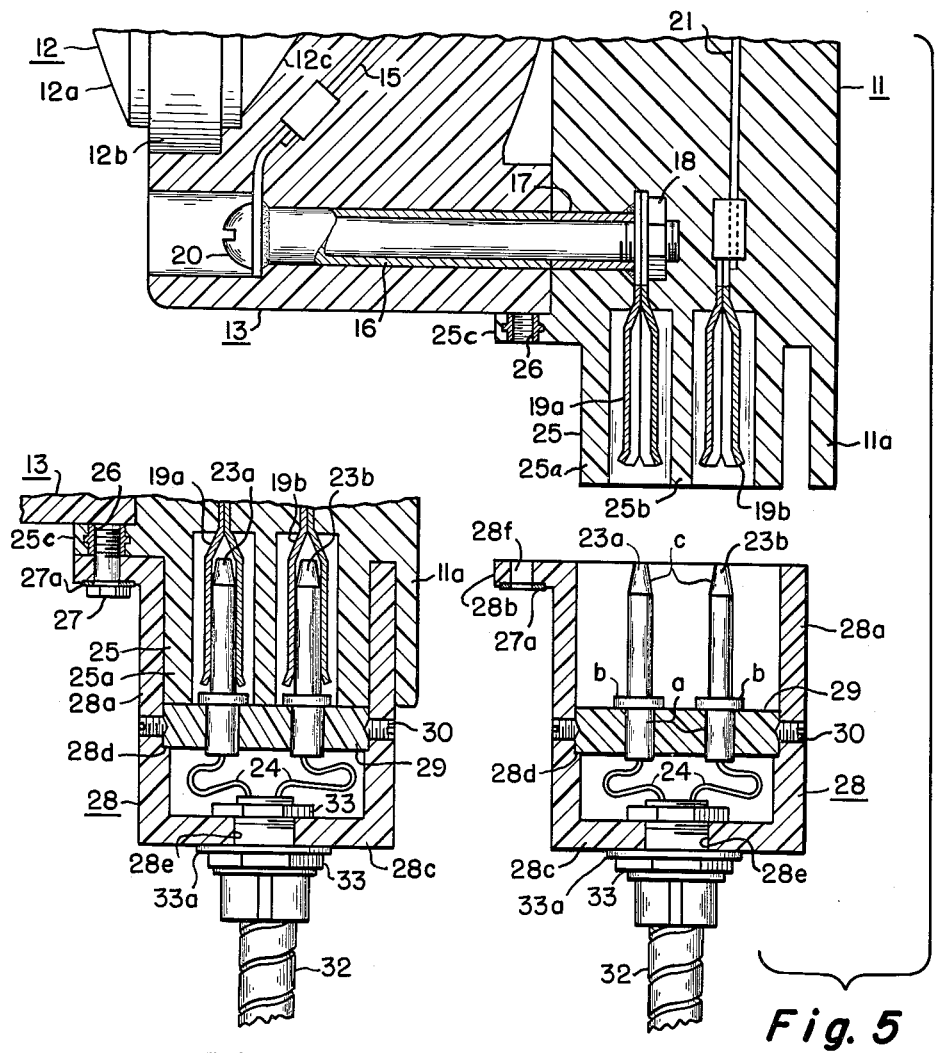
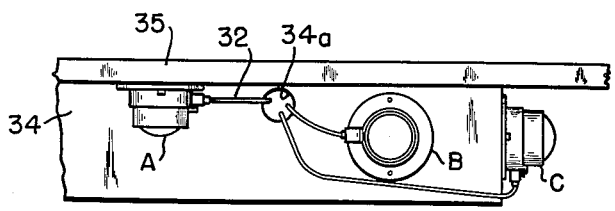
INVENTOR.
Curtis F. Sasserson
BY
HIS ATTORNEYS

United States Patent Office 2,976,513
Patented Mar. 21, 1961

2,976,513

LIGHT UNIT FOR VEHICLES

Curtis F. Sasserson, Warren, Pa., assignor to Pennsylvania Furnace and Iron Company, Warren, Pa., a corporation of Pennsylvania Original application Jan. 14, 1957, Ser. No. 633,951, now Patent No. 2,883,520, dated Apr. 21, 1959. Divided and this application Feb. 3, 1959, Ser. No. 790,968

2 Claims. (Cl. 339—92)

This invention relates to a lighting unit for vehicles and particularly, for meeting the requirements of truck and trailer installations.

A phase of the invention relates particularly to so-called auxiliary lights for automotive vehicles, clearance and stop lights, etc.

This is a division of my application Serial No. 633,951, filed January 14, 1957, now Patent No. 2,883,520, and entitled "Light Unit for Vehicles."

In recent years there has been developed a so-called sealed beam type of headlight which makes use of a light bulb that includes a reflector and lens; the sealed beam is carried as a unit in a suitable metal headlight shell and is held in position by an outer clamping rim or band.

However, other lights such as auxiliary lights, including clearance and stop lights are highly important on over-the-road transportation equipment for the trucking industry. Those used to date employ a large number of parts including gaskets, brackets, holders, lens, mounting screws, a light bulb, contacts, etc. From the installation standpoint of the truck or body manufacturer, it has been necessary to provide brackets or boxes to mount the light assemblies and to run individual wires for the various circuits, splicing them at the lights.

The problem has been one that rests in the complexity of conventional constructions of auxiliary lights, e.g., from the standpoint of installing the original unit, of repairing and/or replacing the unit, as well as from the standpoint of maintaining it. There has thus been a need for a new and improved type of construction which will be more practical on the basis of present day standards.

It has thus been an object of my invention to devise a form of light unit or construction which will be particularly suitable for so-called auxiliary or smaller light installations employed in connection with vehicles;

Another object of my invention has been to so make use of a sealed beam type of light unit in auxiliary light installations as to make it practical from the standpoint of original, maintenance and repair costs, as well as from the standpoint of providing an efficient, trouble-proof, effective lighting unit;

A further object of my invention has been to devise a new and improved form of light unit or construction that will be particularly suitable for truck and trailer utilizations and essentially, for clearance, back-up, stop light, etc. installations;

These and other objects will appear to those skilled in the art from the illustrated embodiment, the description and the claims.

In the drawings, Figure 1 is a mid-side section of a light unit or construction of my invention;

Figure 2 is a front end view on a reduced scale of the unit of and taken along the line II—II of Figure 1;

Figure 3 is a back end view taken along the line III—III of Figure 1 and on the same scale of Figure 2;

Figure 4 is an outer back end view on the same scale as Figures 2 and 3 and taken along the line IV—IV of Figure 1;

Figure 5 is a greatly enlarged side sectional fragment showing a type of connector assembly with male and female plug and socket parts in a disconnected relationship;

Figure 6 is a view on the same scale as and somewhat similar to Figure 5 showing the connector assembly in a mounted or connected relationship; and, Figure 7 is a greatly reduced vertical side fragment illustrating the mounting adaptability of light units constructed in accordance with my invention.

In carrying out my invention, I provide what may be termed a three-part light unit construction which comprises a base, or primary mounting part 11, an intermediate mounting, secondary, light-positioning and electrical-connection-providing part 13, and an outer, front, sealed beam light unit or part 12. However, the parts 12 and 13 are employed as a unitary construction or part from the standpoint of ready replacement of the lighting unit 12. That is, the part 12 becomes a portion of or is molded into the intermediate part 13 to provide an integral part or unit that is replaced and installed when the light 12 burns out or becomes broken. In removing an old light unit and installing a new one for replacement, no difficulty is encountered from the standpoint of electrical connections, damage to light reflector, lens, etc.

Both the parts 11 and 13 are of a material, such as a plastic or hard rubber type of dielectric, that is relatively non-conductive of heat or cold, and that will effectively absorb road and other shocks on the construction or installation. The base part 11, as shown, has a circular outer mounting flange 11a and a set of mounting holes 11b, in order that it may be secured in position on the frame or body of a vehicle. In this connection, self-tapping metal screws or small bolt and nut assemblies may be employed.

The sealed beam light 12 has the usual filament (see Figure 2), a built-in lens portion 12a, a mounting or peripheral flange portion 12b, a back reflector wall portion 12c that may have a facing of silver or polished aluminum, and a pair of insulating or plastic terminals or rear end mounting posts 12d. The portions 12a, 12b and 12c provide a vacuum-sealed unit within whose chamber the filament is to operate; this unit may be of a suitable material such as glass (vitreous). As shown in Figure 1, each post 12d carries a centrally-disposed electric terminal 12e that (as shown in Figure 2) is connected through the back or reflector wall portion 12c to the filament.

Electric terminal pieces or contact fingers 14 of conductive metal are, on their inner sides, brazed or soldered in a mounted position on terminals 12e to project transversely with respect thereto. Each terminal piece or contact finger 14 has, as shown particularly in Figure 1, a set screw 14a that is adapted to secure a tab or eyelet end 15a of one of a pair of electric wire or strap metal leads 15. Each lead at its outer end has a mounting tab or eyelet 15b that is soldered to a conductor sleeve or tube portion 16 which may be of a suitable material such as brass. It will be noted that all of the electrical elements above-mentioned are embedded permanently or impressed within the part 13, as when it is plastically formed. Thus, the light part 12, itself, becomes an integral part of 13 to provide a sub unit. The sub unit is electrically connected and disconnected when it is removed or replaced by screwing-in or screwing-out threaded male elements, mounting screw means, bolts or long-shank screws 20.

It will be noted that each element or screw 20 is threaded at its inner end to cooperate with female threads of terminal positioning or mounting, adjustable securing means or fixed position nuts 18. To facilitate assembly and disassembly, the conductor sleeves 16 terminate at their back ends substantially flush with the back side or face of the part 13. Headed front ends of the elements 20 are offset or intended within sunken pockets or holes in a pair of opposite mounting tab portions of the part 13 (see Figures 1 to 2). Relatively short length continuation, terminal sleeve, or conductor tube portions 17 and 22 are aligned with the sleeve portions 16 to receive and align screws 20.

The terminal part pairs, elements or sleeves 17 and 22 are embedded or molded within the primary or base part 11 to project substantially flush with its front face and abut the back ends of associated or cooperating sleeves 16 of the part 13. Thus, when the screws 20 are tightened down, the sleeves or tubes 16, 22 and 16, 17 are in close end-to-end abutment to further an efficient electrical contact between parts 11 and 13 of the assembly. This provides electrical flow means that is additional to that provided by engagement of the inner ends of the screws 20 with the nuts 18.

To complete electrical connections and provide outlets, I have shown a pair of downwardly-projecting and front-to-back-aligned, inset or hidden, tight-clamping, metal spring sockets 19b and 19a. As shown in Figures 1 and 4, the sockets 19a and 19b may be aligned between front and back faces of the construction. Push pins, electric contacts or terminals 23a and 23b have metal male electrical-conducting portions which are adapted to be fully pushed or inserted within the female sockets 19 and 19a until annular limit or stop flanges of the pins 23a and 23b abut outer edges of the sockets. The outer half portions of the pins 23a and 23b are either of a suitable insulating material or dielectric or are encased in such a type of material, to minimize the possibility of "electric shorts" and make the unit construction weatherproof.

As shown particularly in Figure 4, the sockets 19a and 19b open downwardly from the lowest portion of the construction when the unit 10 is positioned as indicated by C of Figure 7, to thus protect the unit from moisture, etc., and provide a self or gravity-cleaning action. Wire leads 24 provide plus and negative terminals from a source of energy, such as an electric storage battery. The leads 24 are embedded and soldered at their exposed or bare ends within hollow metal sleeves of the pins 23a and 23b. The electrical connections are permanent from the standpoint of ability to remain in place if not manually removed, and are of such a type as to provide a highly efficient and effective electrical connection that does not require splicing or soldering when a replacement unit 12, 13 is to be removed and a new one inserted.

The socket 19b is, at its inner end, soldered or connected to a bare end of a cross-connecting wire, strap metal piece or printed circuit leg 21 whose other end has an eyelet tab 21a. The eyelet tab 21a is shown electrically connected and soldered to the upper terminal tube 22 between it and the mounting nut 18. The other spring socket 19a, at its inner end, has a tab portion which is soldered and electrically connected to the outer end of the lower terminal tube 17 and between it and the mounting nut 18. In this manner, a complete electrical flow circuit is provided through the parts of the unit, which circuit is of an embedded type and thus fully protected from damage, wear and tear, and corrosion.

Since (as shown particularly in Figure 1) the part 13 is molded about the back posts 12d, reflector face portion 12c, and the outer rim flange 12b, it is positively and securely held in position throughout its use as a lighting unit for the vehicle. Its electrical connections being embedded are also not subject to corrosion and are quickly and effectively as well as efficiently electrically-connected to terminal posts of the base part 11 in the manner above indicated. The same means 20 is employed to quickly assemble and disassemble the sub unit (made up of parts 12 and 13) with respect to the base part 11. A substantially flush or planar contact is made between the parts 11 and 13, with a full and accurately-aligned relationship that is assured by the mounting tubes 16, 17 and 22, the bolts 20, and the mounting nuts 18.

In Figures 5 and 6, I show a weather and vapor-tight connector or electric connection assembly of two-part, separable construction. The connector generally employs a type of integral connector portion of the construction of Figure 1, except that it is formed to provide a position-holding, easily assembled and disassembled, shock-resistant male or plug-in part 25 of annular or cylindrical form. In addition, I provide a separate, hood-like socket body or outer part 28 which has a female housing body of annular or cylindrical form. The part 28 is adapted, as shown in Figures 5 and 6, to be frictionally slid or pushed and pulled into and out of a telescopic position with respect to the part 25, so as to engage and disengage spring-like, expansible or resilient metal contact sockets 19a and 19b with the metal contact pins 23a and 23b.

In this connection, the pins 23a and 23b are supported by a forwardly-spaced, transversely-mounted disc, shelf element, or part 29 which may be removably secured in position by threaded set screws 30. Flexible metal (BX cable) or clad conduit 32 which carries the electrical wires or leads 24 is provided at its end with a conventional tighten-up type of threaded stud and spacer nut assembly. As shown, the threaded stud projects through a central opening 28e in rear end wall 28c of the socket body part 28. Nuts 33 are tightened-down upon the wall 28c and against sealing washer 33a to provide a sealed-off joint. This provides a wear-resistant, hood-body-supporting end for the flexible cable 32.

As illustrated particularly in Figures 5 and 6, the electric contact pins 23a and 23b each have a forwardly-declining conical or tapered end portion c to facilitate their entry and withdrawal from within the electric contact sockets 19a and 19b, and to further facilitate the progressive resilient expansion of the sides of the sockets as the pins are inserted into the position of Figure 6. Each pin also has a positioning, mounting annulus, or rim portion b that abuts against the shelf 29 and cooperates with a slightly-enlarged, cylindrical back end portion a to mount and position the pin on and to extend through the forwardly-spaced shelf 29. It will be noted that the pins 23a and 23b are thus of a bayonet type and may be of metal construction throughout.

I provide a sliding frictional fit between inner surfaces of side wall 28a of the socket body part 28 that frictionally engage (see Figure 6) upon outer surfaces of corresponding wall 25a of the part 25. As shown in Figure 6, the flange 11a (a part of the base member 11) and the wall 25a provide a sandwich-like sliding fit with the wall 28a that is received therebetween. I have been able to eliminate complex securing means such as threaded portions or annular flanges, by reason of an easily-manipulated, effective, and tight-sealing fit between the wall portions 25a and 28a and 11a and 28a of the connector parts 25 and 28, and resilient, tight-sliding contacts made between parts 19a and 23a, 19b and 23b. As a result, I find that a simple tab connection is entirely suitable, even when the vehicle on which the light unit is mounted is subjected to rough roads, vibration, etc. It will be noted that opposed mounting tab portions 25a and 28b are in a transversely-opposite relationship with the area of sandwich fit of cooperating wall portions of the assembly.

The plug part 25 has, as shown, a transversely-projecting tab portion 25c within which is inset or secured a threaded metal sleeve mount 26. The mount 26 may, as shown, be provided with a web or a disc flange to secure it as an integral part of the plastic body 25. The plastic body of the socket part 28 is provided with a transversely-outwardly projecting tab portion 28b and an inset metal washer 27a. Opening 28f through the tab portion 28b is adapted to receive a threaded stud or bolt 27 to, as shown in Figure 6, provide a single, tool-manipulative, means for securing the assembly in position. It will be apparent that 27 may have a wrench flat or a screw type of head.

In Figure 7 I have illustrated the flexibility of mounting of the unit 10 of my invention. In this figure, 34 may represent the side of a frame or wall portion of a vehicle and 35 may represent a floor or bed member. It is thus seen that units 10, as exemplified by A, B, and C, may be easily and simply mounted to direct light downwardly, sidewise or endwise, and by utilizing a single cable entrance opening 34a. The side or substantially parallel mounting of the connector assembly 25—28 does not in any sense interfere with the flat base mounting of the light units. Where it is desirable to use a group of light units of my construction as a combination or assembly in a single, large, outer or primary housing part 11, the connections may be simplified somewhat to provide a combined plug connector and cable assembly. In such an event, a plurality rather than a pair of pin and socket contacts may be used, depending upon whether or not the units are to be controlled together or separately.

What I claim is:

1. In a quickly detachable electrical connection for an electrical unit exteriorly mounted on a vehicle and that will withstand road shock and weather elements and wherein the electrical unit has a base member secured on the vehicle to project therefrom and electrical connections are embedded in the base member, a connector to be electrically connected to a source of electricity and having a pair of connector parts that are separable with respect to each other, one of said connector parts being integral with and extending substantially parallel to a mounting face of and from the base member, contact element sets for removable electrical connection in a fitted relationship with each other, one set being carried within the connector part that is integral with the base member and being connected to the electrical connections thereof, the other set being carried within the other connector part and connected to the source of electricity, one set having spring-like socket elements and the other set having plug elements to securely fit within said socket elements, one of said connector parts having a plug-shaped body provided with a forward open end portion about its contact element set and the other having a hood-shaped socket body provided with a forward open end portion about its contact element set to telescopically fit over said plug-shaped body of the one part and seal it off when said contact element sets are in a fitted relation to conduct current from the source of electricity to the electrical connections of the base member; said plug-shaped body having an outer wall extending about and forwardly along its open-end portion and having an intermediate partition wall extending forwardly along said outer wall and between the contact elements of the set of said plug-shaped body to define a pair of forwardly open-end slots along each contact element of the set carried thereby, a wall flange integral with said plug-shaped body and extending forwardly along a side of said outer wall in a spaced forwardly-open end-slot defining relation therewith, an integral mounting tab on an opposite side of said outer wall defining a forward abutment face that extends substantially perpendicular to said outer and partition walls and said wall flange adjacent inner bottom ends of the slots defined thereby, and said mounting tab having a threaded portion open forwardly of its abutment face; said hood-shaped body having an outer wall extending about and forwardly along its open-end portion to define a forwardly open-end socket along its contact element set, the outer wall of said hood-shaped body having an inner diameter substantially corresponding to the outer diameter of the outer wall of said plug-shaped body, the outer wall of said hood-shaped body having a thickness along a side thereof corresponding to the width of the slot defined by the outer wall and the wall flange of said plug-shaped body, so that said hood-shaped body will fit over the outer wall of said plug-shaped body in a tight sealing telescopic relation therewith and that the wall flange and the adjacent side of the outer wall of said plug-shaped body will have a sandwich-like sliding fit over the above-mentioned side of said hood-shaped body, the outer wall of said hood-shaped body having an integral fastening tab opposite the portion thereof having the sandwich-like fit, said fastening tab defining a forward abutment face that extends substantially perpendicular to the outer wall of said hood-shaped body adjacent the forward-open end of the socket defined thereby and parallel to the corresponding face of said mounting tab of said plug-shaped body, said fastening tab having a hole therethrough in alignment with the threaded portion of said mounting tab of said plug-shaped body, a transverse member secured within the outer wall of and extending across said hood-shaped body within the socket defined thereby and in a backwardly-spaced relation from its forward open end portion; the whole being constructed in such a manner that forward ends of the outer wall and the partition wall of said plug-shaped body have a sealing abutment with said transverse member, forward ends of the outer wall of said hood-shaped body having a sealing abutment with base portions of the slots defined by the outer wall and the partition wall and the wall flange of said plug-shaped body and with a connecting portion of said mounting tab, and the forward face of said fastening tab is in an aligned abutment with the forward face of said mounting tab; and a headed threaded stem means positioned to extend through the hole in said fastening tab to engage the threaded portion of said mounting tab and removably secure said hood-shaped body in its sealed-off telescopically mounted relationship over said plug-shaped body.

2. An electrical connection as defined in claim 1 wherein, said plug and hood-shaped bodies are of dielectric material, back end portions of the contact element set of said hood-shaped body extend backwardly through said transverse member, said hood-shaped body has an enclosing back end wall through which electrical connections extend to the back end portions of the contact element set carried by said transverse member, and said transverse member has a forwardly-spaced relationship with the back end wall of said hood-shaped body to define a compartment with respect thereto.

References Cited in the file of this patent

UNITED STATES PATENTS

| | | |
|---|---|---|
| 1,686,534 | Rosenzweig | Oct. 9, 1928 |
| 2,444,046 | Jacobs | June 29, 1948 |
| 2,540,012 | Salati | Jan. 30, 1951 |
| 2,730,685 | Sperzel | Jan. 10, 1956 |

FOREIGN PATENTS

| | | |
|---|---|---|
| 465,116 | Great Britain | Apr. 30, 1937 |